United States Patent
Kelyman

(10) Patent No.: US 9,770,684 B1
(45) Date of Patent: Sep. 26, 2017

(54) DRUM FILTER MEDIA CLEANING APPARATUS

(71) Applicant: Brunn Air Systems, Inc., Memphis, TN (US)

(72) Inventor: John Kelyman, Memphis, TN (US)

(73) Assignee: Brunn Air Systems, Inc., Memphis, TN (US)

( * ) Notice: Subject to any disclaimer, the term of this patent is extended or adjusted under 35 U.S.C. 154(b) by 0 days.

(21) Appl. No.: 15/463,844

(22) Filed: Mar. 20, 2017

Related U.S. Application Data

(60) Provisional application No. 62/313,550, filed on Mar. 25, 2016.

(51) Int. Cl.
| | |
|---|---|
| *B01D 46/00* | (2006.01) |
| *B01D 46/26* | (2006.01) |
| *B01D 46/24* | (2006.01) |
| *B01D 46/44* | (2006.01) |
| *D21G 9/00* | (2006.01) |

(52) U.S. Cl.
CPC ..... *B01D 46/0068* (2013.01); *B01D 46/0071* (2013.01); *B01D 46/2403* (2013.01); *B01D 46/26* (2013.01); *B01D 46/446* (2013.01); *D21G 9/00* (2013.01)

(58) Field of Classification Search
CPC B01D 46/00; B01D 46/0068; B01D 46/0071; B01D 46/2403; B01D 46/26; B01D 46/446; D21G 9/00
USPC .................................................. 55/282–305
See application file for complete search history.

(56) References Cited

U.S. PATENT DOCUMENTS

| | | | | |
|---|---|---|---|---|
| 4,247,310 A | * | 1/1981 | Borst | B01D 46/002 55/303 |
| 4,589,524 A | * | 5/1986 | Laycock | F01M 11/04 184/103.1 |
| 4,830,642 A | * | 5/1989 | Tatge | B01D 46/0068 210/333.1 |
| 8,597,391 B1 | * | 12/2013 | Dietz | B01D 46/2403 210/402 |
| 2010/0307339 A1 | * | 12/2010 | Tadrous | B01D 46/0063 95/280 |

* cited by examiner

*Primary Examiner* — T. Bennett McKenzie
(74) *Attorney, Agent, or Firm* — PatentBest; Andrew McAleavey

(57) ABSTRACT

An apparatus and method for cleaning a drum filter medium are disclosed. Air with entrained particulate matter, e.g., from a papermaking process, flows through a filter medium positioned along the perforated circumferential surface of a rotating drum. At least some of the particulate matter is caught on or in the filter medium. A set of suction nozzles provided proximate to the surface of the filter medium is provided to draw the particulate matter off of the filter medium. A complementary set of compressed air nozzles simultaneously delivers compressed air to drive particulate matter off of the filter medium and into the suction nozzles. This cleans the filter medium in situ and extends its useful life.

15 Claims, 6 Drawing Sheets

DRUM FILTER MEDIA CLEANING APPARATUS

CROSS-REFERENCE TO RELATED APPLICATIONS

This application claims priority to U.S. Non-Provisional Application No. 62/313,550, filed Mar. 25, 2016, the entirety of which is incorporated by reference herein.

BACKGROUND OF THE INVENTION

1. Field of the Invention

The invention relates to papermaking machinery and processes, and more particularly, to drum filter media cleaning apparatus.

2. Description of Related Art

Papermaking processes generate enormous amounts of dust. That dust is typically trapped by a network of hoods and, if desired, sent for final cleaning and re-use in the papermaking process. The main filter used to separate dust and particles from the air stream for cleaning and re-use is typically a large, perforated rotating drum with a filter medium installed along its exterior surface. The drum is placed within an enclosure, and dirty air with entrained paper dust and particles is expelled along its exterior surface. The dirty air is then drawn through the filter medium, cleaning it.

This process causes residue to accumulate on the exterior of the drum; the amount and type of that residue will vary with the product being produced. As the residue builds up, it can restrict the airflow through the drum, in turn causing a reduction in airflow through the hoods that capture the dust, which then causes more general problems in the manufacturing process itself.

In order to deal with buildup on the drum filter medium, an array of suction nozzles operates on the filter medium along the exterior of the drum, drawing accumulated residue off for final cleaning and re-use. These suction nozzles may, for example, be controlled with a solenoid or solenoids and timed to operate at certain intervals. However, if too much residue builds up, the suction nozzles may not be capable of drawing it off properly.

SUMMARY OF THE INVENTION

One aspect of the invention relates to a filtration and cleaning apparatus. The apparatus includes an enclosure with an inlet and an outlet. A drum filter is provided in the enclosure, and is covered by a filter medium. Air flows from the inlet, through the filter medium, and to the outlet. Meanwhile, a set of suction nozzles is positioned proximate to the filter medium to draw particulate matter trapped on or in the filter medium off, and a complementary set of compressed air nozzles simultaneously provides compressed air to drive the particulate matter off of the filter medium and into the suction nozzles. In some embodiments, a control system may be provided, including a differential pressure sensor that measures the pressure drop across the filter medium. When the pressure drop exceeds a defined threshold, the suction and compressed air may be activated to clean the filter medium in situ, thereby potentially extending its working life. Networks of piping and valves may be used to divide the filter medium into "zones," with only certain zones actively cleaning the filter medium at any one time.

Another aspect of the invention relates to methods for using such an apparatus. The methods involve providing suction and compressed air simultaneously and in concert to clean a filter medium in situ. The suction and compressed air may be provided selectively, e.g., only when the pressure drop or differential pressure across the filter medium indicates that the filter medium is or is becoming clogged, and in some cases, only to a portion, or one or more "zones" of the filter medium at any one time.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the invention, and in which.

DETAILED DESCRIPTION

Figure 1:
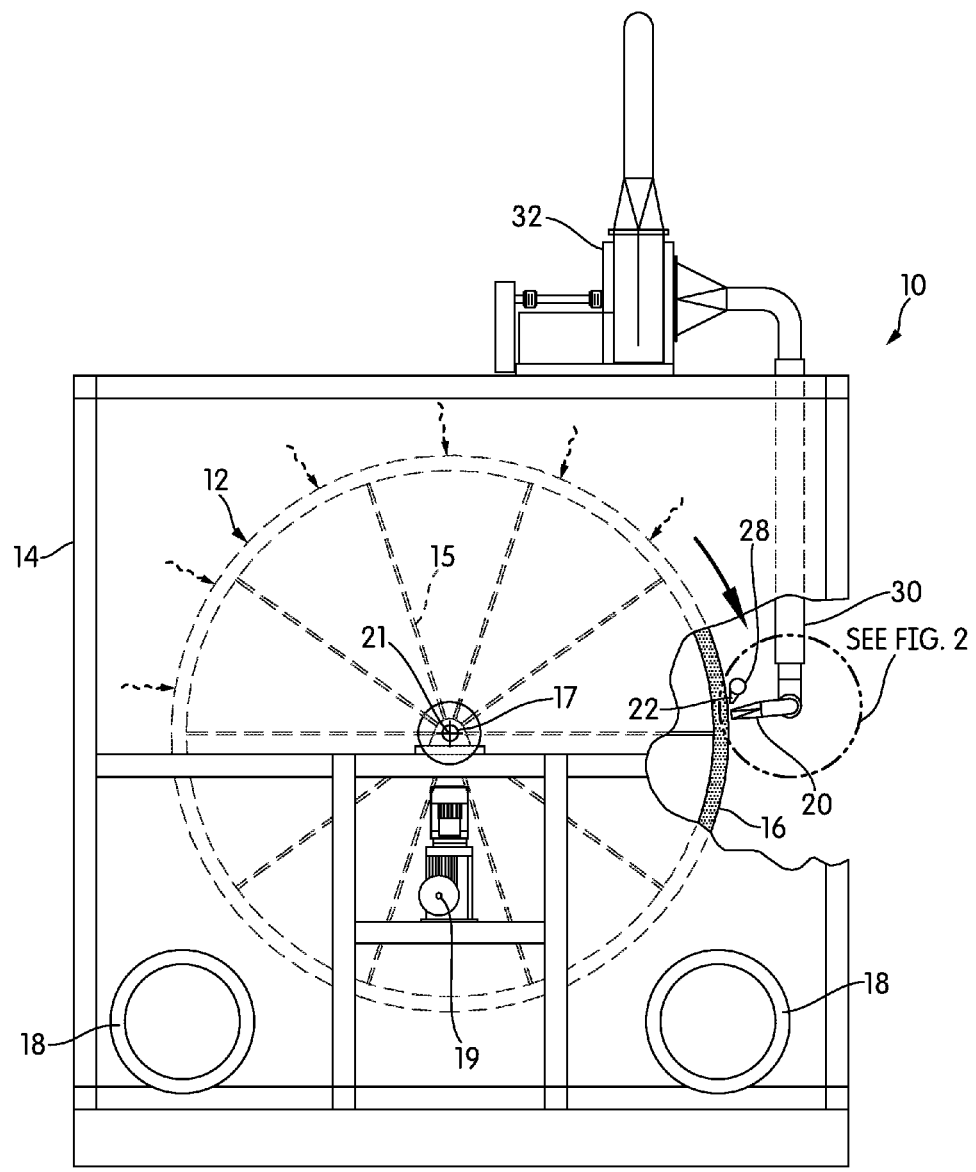
FIG. 1 is a partially cut-away end elevational view of one end of a drum filter assembly.

FIG. 1 is a partially cut-away end-elevational view of one end of a drum filter assembly, generally indicated at 10, according to one embodiment of the invention. In the assembly 10, a drum filter 12, rotates within an enclosure 14, for example in a clockwise direction, as illustrated in FIG. 1. The drum filter 12 is typically a hollow cylinder with an open, metal-mesh or perforated metal circumference, and has a plurality of internal support members or spokes 15 that radiate from a central hub 17 to an interior circumferential edge of the drum filter 12. While the end-elevational view of FIG. 1 shows the spokes 15 along a single plane, the spokes 15 are spaced along the entire length of the drum filter 12. The diameter of the drum filter 12 may be on the order of 12 feet (3.7 m), but may vary in diameter from 9-16 ft (approximately 2.75-4.88 m), depending on the materials being handled, the airflow volumes, and other factors.

As shown in FIG. 1, the enclosure 14 is large enough to enclose the drum, and has a generally rectilinear shape in the illustrated embodiment, although other shapes are possible. The enclosure 14 is generally at least somewhat airtight, and may be completely sealed in some embodiments. Two relatively large-bore inlet ducts 18 supply dirty or particulate-rich air to the enclosure 14, where it is drawn into the space around the exterior of the drum filter 12 by a separate set of fans or blowers (not shown). In the illustrated embodiment, the ducts 18 are positioned near the floor of the enclosure 14, on both sides, although their positioning may be different in other embodiments.

The interior of the drum filter 12 is in fluid communication with an attached fan or blower 24 (shown in FIG. 3), creating a region of negative air pressure that promotes the flow of "dirty" air from the space around the drum 12, through a filter medium 16 and the drum 12 itself, and into the interior space of the drum 12, as will be described below in more detail. The whole of the enclosure 14 operates at a negative pressure to facilitate this air movement.

The filter medium 16 covers the entire exterior circumferential wire-mesh or perforated surface of the drum 12. The drum filter medium 16 may be a single continuous porous sheet extending over the entirety of the exterior of the drum filter 12. For example, the medium 16 may be a single cylindrical sheet that is zippered or otherwise fastened around the drum 12. As the term is used here, "drum filter medium" refers to a fine-mesh metal filter, a porous textile material (e.g. a thick felt or a fibrous material), or any other material that has a porosity allowing air—but not dust—to pass.

Actual airflow rates through the filter medium 16 may vary considerably from embodiment to embodiment. For example, the velocity at which air flows through the filter medium 16 is generally expected to be about 100-140 feet per minute (30.48-42.7 m/min); however, this may vary depending upon the original porosity of the filter medium 16, as well as the effective porosity of the filter medium 16 after it has been in use. As the air passes through the filter medium 16, dust and other matter entrained in the air accumulates on the filter medium 16. (For purposes of this description, the term "dust" refers to all manner of particulates and other matter that may be entrained in the "dirty" air, and ultimately, deposited in or on the filter medium 16.)

In order to make the most effective use of the entire surface area of the filter medium 16, the drum 12 rotates. Specifically, a drive system 19 causes the drum filter 12 to rotate at a fixed, relatively slow rate (e.g. 3-4 RPM). The drive system 19 may be, for example, a belt-drive or gear-based system; in general, any suitable method of driving the drum filter 12 at a controlled and relatively slow rate of rotation may be used. In the illustrated embodiment, the drive system 19 is external to the enclosure 14 and drives a shaft 21 on which the hub 17 is mounted. Other arrangements are possible.

An array of suction nozzles 20 and complementary compressed air nozzles 22 are located within the enclosure 14 and act in concert on the filter medium 16 to remove dust as the drum rotates 12, thereby cleaning the filter medium 16 in situ, potentially prolonging the life of the filter medium 16, and, optionally, extracting the dust for recycling back into the papermaking process. In the embodiment of FIG. 1, these nozzles 20, 22 are found on one side of the drum filter 12, as will be described in more detail below, although other locations may be used.

Figure 2:
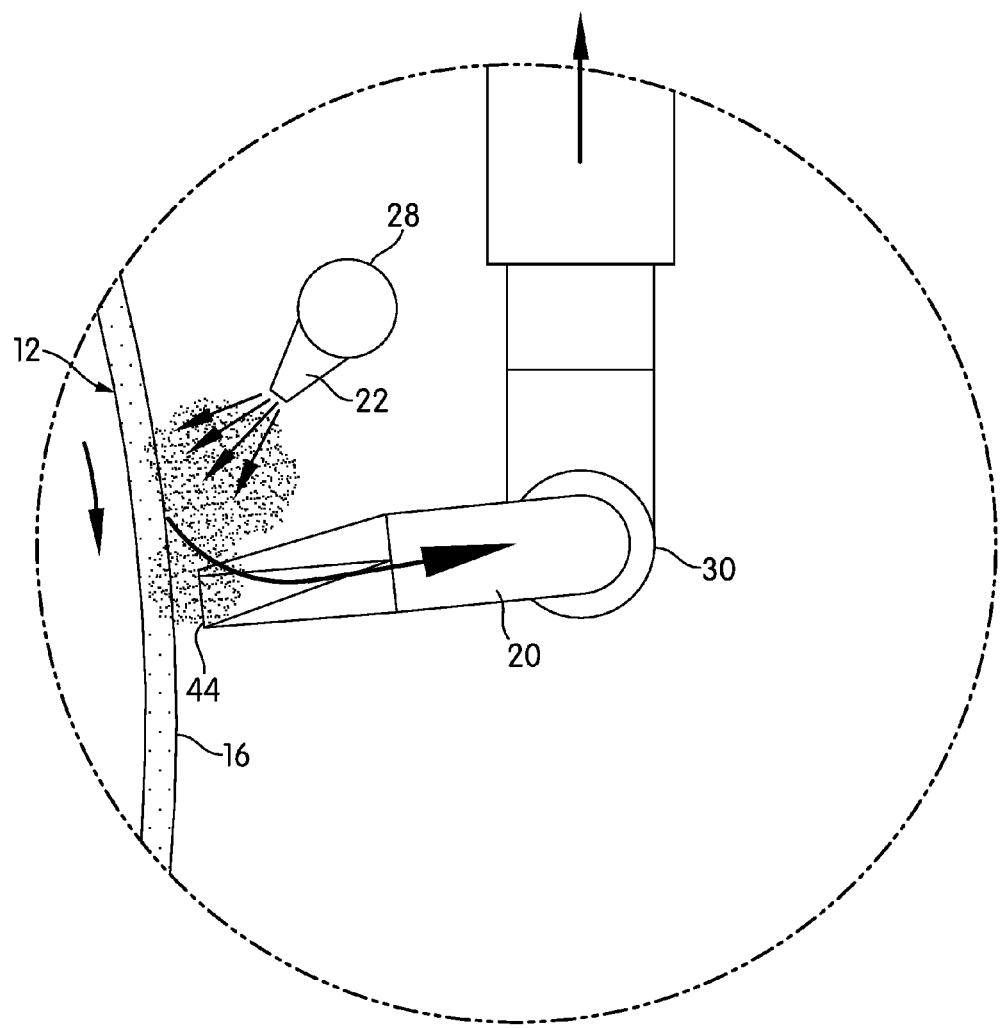
FIG. 2 is a partially sectional detail view of a portion of FIG. 1.

FIG. 2 is a detail view of a portion of FIG. 1. As shown in the detail view of FIG. 2, the set of suction nozzles 20 extends along one side of the drum filter 12, positioned to clean the filter medium 16 by capturing material from the filter medium 16 as the drum filter 12 rotates. In FIG. 2, the nozzle 20 is connected to a vacuum pipe 30, through which captured residue may be evacuated at a velocity of, for example, 300 ft/min (91.4 m/min). In some cases, multiple suction nozzles 20 may be triggered to evacuate air simultaneously through pipe 30, allowing higher airflow volumes to be achieved. For example, if more than one suction nozzle 20 is being used simultaneously, it is expected that an overall airflow of 600-1000 CFM (approximately 17-28 m³/min) may be achieved.

A separate set of compressed air nozzles 22, extending along one side of the filter 12 and positioned proximate to the suction nozzles 20, supplies compressed air at, e.g., 30-90 pounds per square inch gauge (PSIG; 206-620 kPa). The nozzle 22 shown in FIG. 2 is connected to a compressed air pipe 28, and is directed toward the drum filter medium 16 as well as the suction nozzles 20. The compressed air nozzles 22 are positioned to dislodge residue from the filter medium 16 and drive it toward the suction nozzles 20, as well as dislodge material obstructing airflow of the suction nozzles 20. In some cases, the compressed air nozzles 22 may be referred to as compressed air ramps.

Each suction nozzle 20 is positioned very near the drum filter medium 16 as the drum 12 rotates, for example, on the order of 0.125-0.25 inches (0.32-0.64 cm) away, and in some instances may make contact or nearly make contact with the filter medium 16 itself. As shown in FIG. 2, the suction nozzle 20 itself is perpendicular or nearly perpendicular to the surface of the filter medium 16. The compressed air nozzle 22, on the other hand, is positioned above the suction nozzle 20 and is somewhat more set back from the filter medium 16. It also makes an acute angle with the filter medium 16 (e.g., 30-60°, depending on the embodiment), instead of being normal or perpendicular to the surface of the filter medium 16. Typically, the compressed air will be directed in the direction of rotation. (As was noted above, in FIGS. 1 and 2, the drum 12 rotates clockwise, as indicated by the arrow in FIG. 1.)

The compressed air nozzles 22, which are mounted above the suction nozzle 20 in FIG. 2, may be mounted below the suction nozzles 20, oriented such that residue may be effectively drawn away by the suction nozzles 20. However, the orientation, position, spacing, and airflow of the nozzles 20, 22, and their corresponding pipes 28, 30 may vary depending on the drum filter 12 rotational direction, as well as the type, nature, and volume of the residue to be removed.

Figure 3:
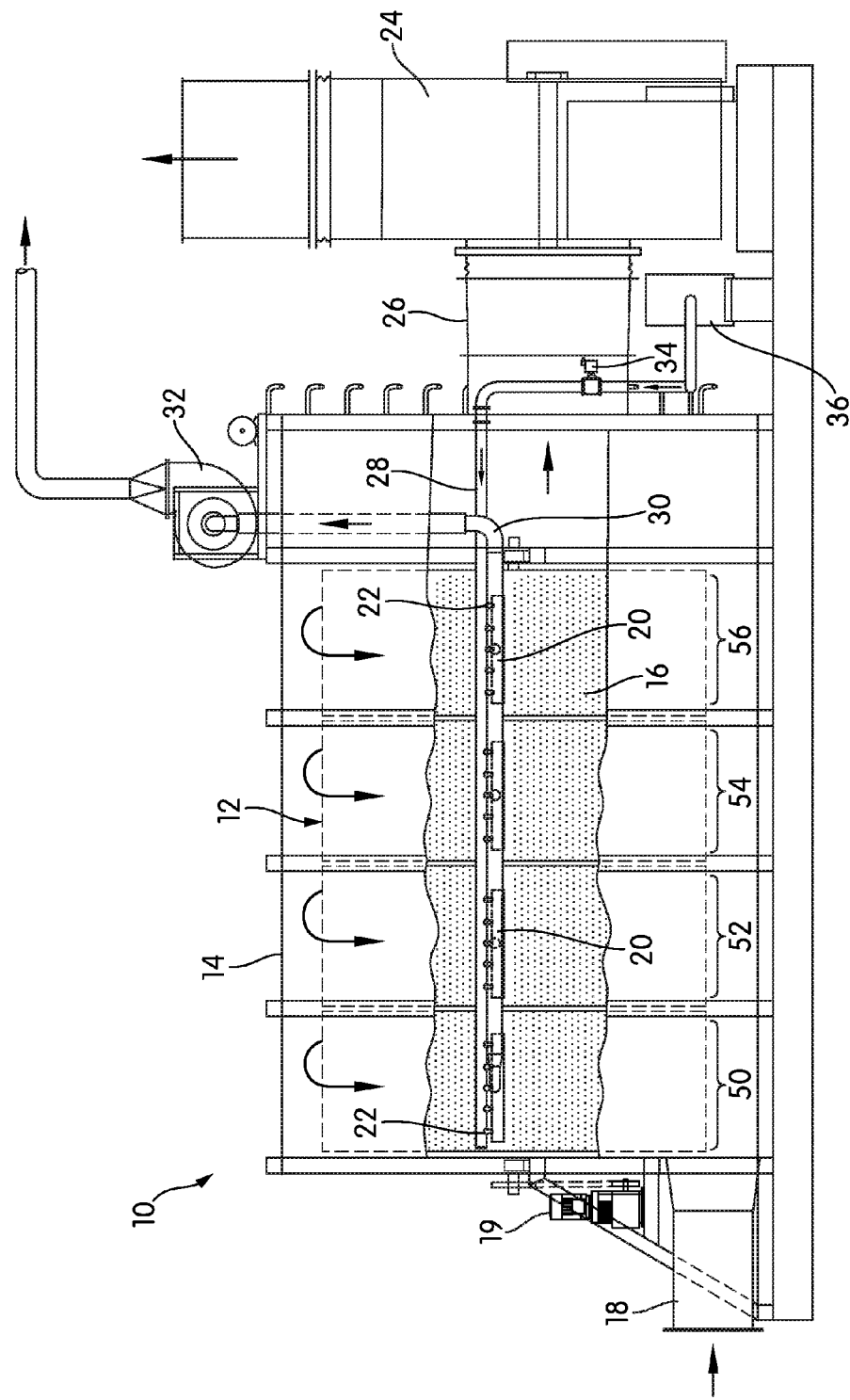
FIG. 3 is a side elevational view of one side of the drum filter assembly of FIG. 1.

FIG. 3 is a side elevational view of the drum filter assembly 10. As can be appreciated in FIG. 3, the suction nozzles 20 of the illustrated embodiment are different in overall shape and extent than the compressed air nozzles 22. There are four suction nozzles 20 provided over the length of the drum 12 and its filter medium 16. Each suction nozzle 20 provides a broad, flat, elongate inlet 44 and may taper down in width from the inlet 44 to its outlet 44, where it connects to the vacuum pipe 30, giving each suction nozzle 20 a generally triangular shape in top plan view. Each compressed air nozzle 22, on the other hand, is a discrete, typically conical nozzle that emerges from another pipe 28. The shape of the suction nozzles 20 can be better appreciated from FIG. 4, a cutaway top plan view of the assembly 10, illustrating the interior of the enclosure 12.

The four large suction nozzles 20 divide the filter medium 16 into four sections or "zones" 50, 52, 54, 56, each of which is serviced by one of the suction nozzles 20 and, in the illustrated embodiment, an array of five compressed air nozzles 22. As will be described below in more detail, not all of the zones 50, 52, 54, 56 need be active at any one time. The number of zones 50, 52, 54, 56 used in any particular embodiment is arbitrary and dependent on a number of factors. In other embodiments, 3-8 zones may be used, each with its own suction nozzle or nozzles 20 and array of compressed air nozzles 22.

Figure 4:
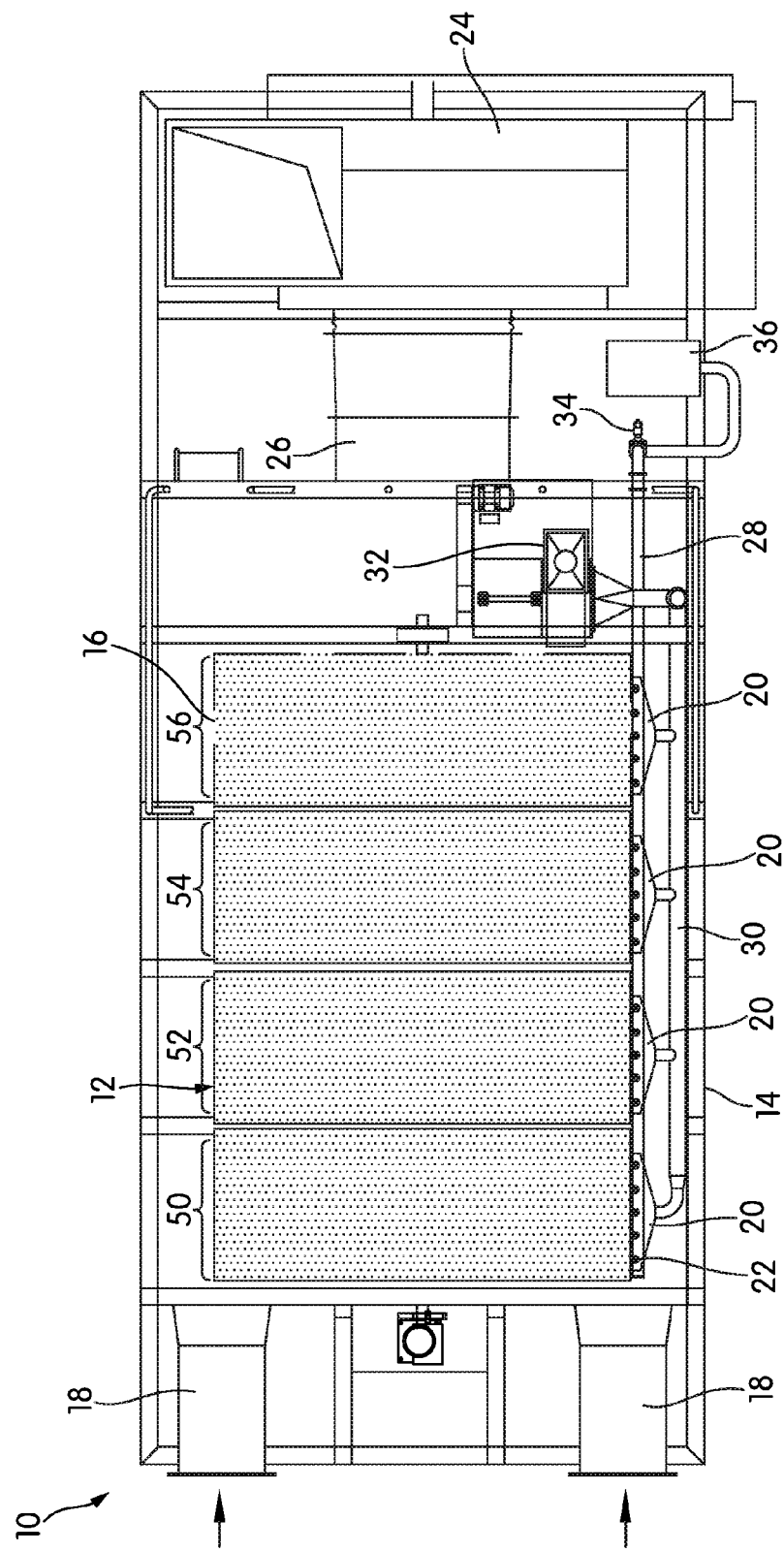
FIG. 4 is a partially cut-away top plan view of the drum filter assembly of FIG. 1.

FIGS. 3 and 4 also illustrates other components of the assembly 10. As shown in FIG. 3, a fan 24, positioned on the "output" end of the assembly 10, opposite the intake 18 and drive system 19, is in fluid communication with the interior of the drum filter 12 via a large duct 26. The fan 24 draws unfiltered air from the enclosure 14, through the drum filter medium 16, to the interior of the drum filter 12, where the air is expected to be relatively clean, as it has been filtered. The fan 24 draws dirty air from the enclosure 14 and through the filter medium 16 on the drum 12 by creating a region of negative air pressure within the interior of the drum 12 (relative to the enclosure 14). From the interior of the drum 12, air is drawn through the large conduit 26, and sent back into an air handling system to be recycled. Thus, the enclosure 14 is maintained at a negative pressure that drives air with entrained dust through the drum filter medium 16.

Additionally, as shown in FIGS. 3 and 4 and described briefly above, the compressed air pipe 28 extends essentially the entire width of the drum filter 12 and includes a number of compressed air nozzles 22, spaced regularly from each other at an equal pitch. As is shown in FIGS. 3 and 4, the compressed air nozzles 22, while spaced regularly from each other, may be positioned at a regular pitch or spacing over portions of the zones 50, 52, 54, 56 where the suction nozzles 20 are located.

The compressed air pipe 28 is connected to one or more compressors 36, and in some embodiments, the compressed air nozzles 22 may be controlled by a solenoid or solenoids 34. The vacuum pipe 30, connected to a high-pressure fan 32, extends in the same direction as the compressed air pipe 28 over the entire length of the drum filter 12 and carries the suction nozzles 20. As can be seen in FIG. 3, the two pipes 28, 30 are parallel and relatively close to one another, so that the two sets of nozzles 20, 22 can cooperate, as described above. A high-pressure fan 32 is connected to the vacuum pipe 30. Beyond the high-pressure fan 32, the captured dust may be sent back into the papermaking process. In the embodiment illustrated in FIG. 3, the nozzles 20 are expected to work constantly, in unison with compressed air nozzles 22.

Figure 5:
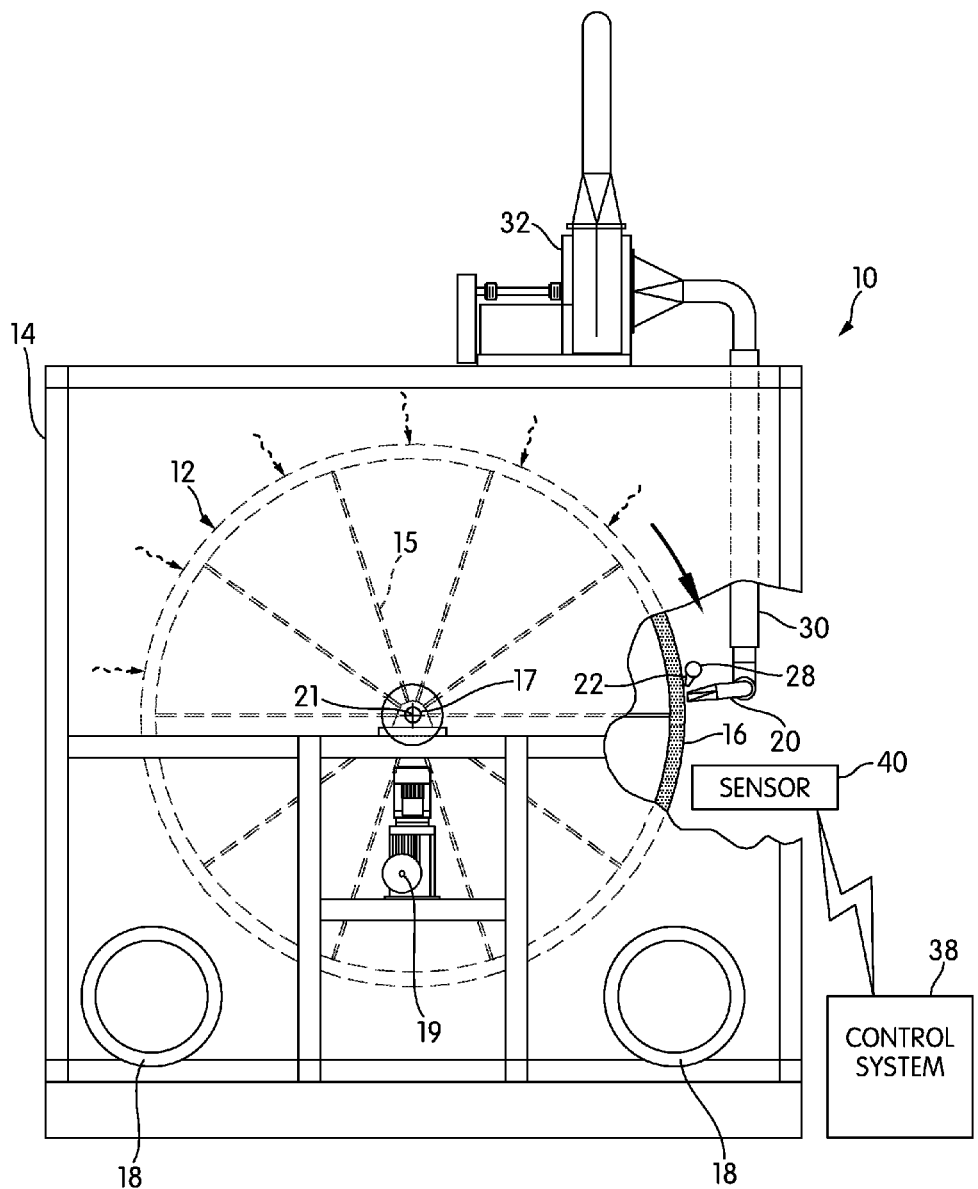
FIG. 5 is a partially cut-away end elevational view of an additional embodiment of the drum filter assembly.

FIG. 5 is a partially cut-away end elevational view of the additional embodiment of the drum filter assembly 10, with a control system 38 installed. In FIG. 5, the control system 38 is shown schematically.

Due to the high volumes of air needed for the nozzles 20, 22 to perform their functions, it may be advantageous to temporarily block airflow to certain of the nozzles 20, 22, while allowing airflow in the remaining nozzles 20, 22. For this reason and others, it is convenient to divide the drum 12 into zones 50, 52, 54, 56. If such a configuration is used, airflow can be switched periodically from one zone to another, ensuring that each zone 50, 52, 54, 56 of the drum filter 12 is cleaned relatively evenly. In other words, it may be advantageous if some of the nozzles 20, 22 are switched on and off periodically, rather than all of the nozzles 20, 22 operating continuously, as will be described in more detail below. The control system 38 performs at least these functions, and may perform other control functions as well.

As can be appreciated from FIG. 5, the control system 38 includes an air pressure gauge 40, illustrated schematically in FIG. 5 and located generally within the enclosure 14, where it reads the differential pressure within the enclosure 14, i.e., the difference in pressure between the exterior of the drum 12 and the interior of the drum 12. When the pressure differential (i.e., delta pressure, or ΔP) increases and reaches a threshold value, it is a sign that the filter medium 16 is clogged and sufficient air is not being evacuated by the main fan 24. Gauge 40 may communicate with the control system 38 by any suitable means, such as a wire, a pipe, or a Bluetooth® connection. The particulars of the control system 38 and the locations of the gauges 40 may vary, so long as the pressure differential is efficiently and accurately measured.

When the control system 38 has detected that the pressure differential has reached a predetermined threshold, e.g., 1.75 inches of water (434 Pa), that is taken as an indication that the porous drum filter medium 16 is clogged and requires cleaning. When it has been determined that the drum filter media 16 requires cleaning, the control system 38 is configured to trigger the suction nozzles 20. Thus, the control system 38 is capable of selectively shutting off airflow to some suction nozzles 20, while a solenoid 34 triggers a set of compressed air nozzles 22 corresponding to the active suction nozzles 20, as will be described in more detail below.

Figure 6:
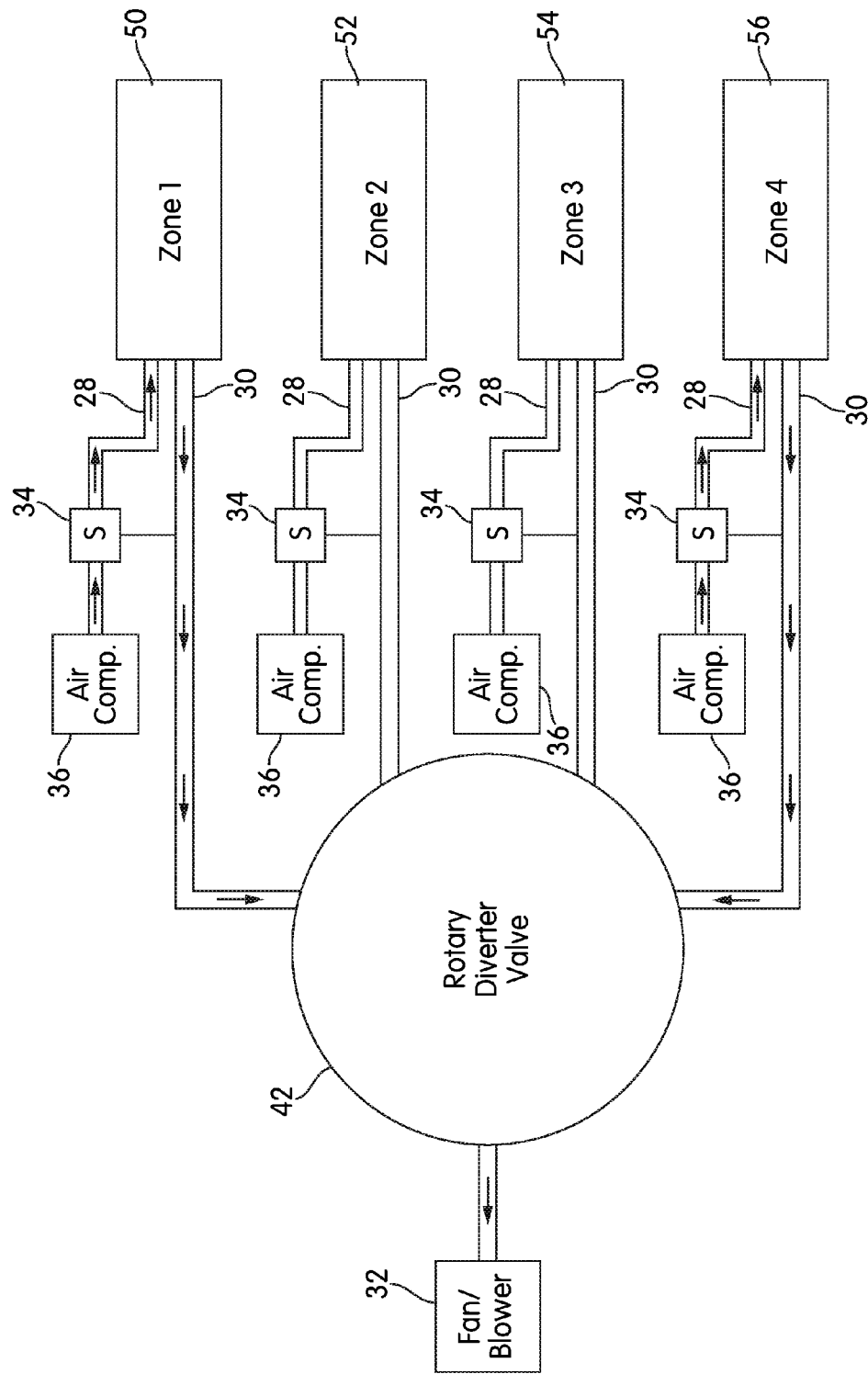
FIG. 6 is a schematic diagram of the drum filter assembly of FIG. 4, in isolation.

FIG. 6 is a schematic diagram of the drum filter assembly 10 of FIG. 4, illustrating the general airflow configuration. As can be seen in FIG. 6, there are four zones 50, 52, 54, 56, each with its own compressed air supply pipe 28, vacuum pipe 30, and associated nozzles 20, 22 (not shown in FIG. 6). In the illustration of FIG. 6, only two of those zones 50, 56 are being cleaned; the other two zones 52, 54 are not.

The fan 32 is constantly drawing air; however, a rotary diverter valve (RDV) 42 selectively shuts off suction to certain zones 52, 54. Thus, the suction nozzles 20 for the selected zones 52, 54 are temporarily deactivated, and the drum filter media 16 of those zones 52, 54 are not being cleaned. Solenoids 34 are in communication with the suction pipes 30 such that when the RDV 42 connects the fan 32 with a particular zone 50, 52, 54, 56, a solenoid 34 associated with the corresponding compressed air pipe 28 opens, sending compressed air to corresponding compressed air nozzles 22. For example, the solenoids 34 on the compressed air pipes 28 for zones 50 and 56 are activated when air flows from the suction nozzles 20 of zones 50 and 56, through pipes 30.

For ease in illustration, each compressed air pipe 28 is shown as being attached to its own compressor 36. This may be the case in some embodiments, while in other embodiments, the compressed air pipes 28 from all of the zones may be connected to a single compressor through a valve, like the RDV 42, that can selectively send compressed air through some of the pipes 28.

As those of skill in the art will understand, while an RDV 42 is described here, other flow diverting and managing structures and apparatus may be used. For example, a manifold or a collection of other types of valves could be used to divert flow between zones 50, 52, 54, 56, and references to the RDV 42 should be read as including equivalent mechanisms unless otherwise indicated.

In some embodiments, the compressed air nozzles 22 may deliver air for a predetermined, fixed amount of time; for example, the compressed air nozzles 22 may activate for 15 to 30 seconds per activation of the suction nozzles 20. The compressed air nozzles 22 are expected to function for about the same period as the suction nozzles 20 in many embodiments. However, the amount of time the compressed air nozzles 22 are active relative to the suction nozzles 20 depends on the drum 12 dimensions, as well as the type, nature, and volume of the residue to be removed.

As an example, FIG. 6 illustrates cleaning of the drum filter media 16 of zones 50, 56. After the illustrated zones are sufficiently cleaned, the RDV 42 would shut off airflow to the suction nozzles 20 of zones 50, 56, while activating the suction nozzles 20 of the other zones 52, 54. The flow of air through the vacuum pipes 30 triggers the corresponding solenoids 34 to open and begin compressed air flow through the corresponding compressed air pipes 28. The fan 32 is generally expected to function continuously while the RDV 42 switches from one zone or set of zones to another in typical operation of the drum filter assembly 10. Any number of zones could be cleaned simultaneously.

The RDV 42 may also divert the entire flow from the fan or blower 32 to an external vent if all cleaning is to be shut down temporarily, e.g., to clean the nozzles 20, 22 or associated pipes 28, 30. This may be easier than starting and stopping the fan or blower 32 if the cleaning process must be stopped entirely for a short period of time, and it avoids situations where accumulated pressures due to closed valves could damage a pipe, duct, or the fan 32 itself.

While the invention has been described with respect to certain embodiments, the description is intended to be exemplary, rather than limiting. Modifications and changes may be made within the scope of the invention.

What is claimed is:

1. A filtration and cleaning apparatus, comprising:
an enclosure having an air inlet and an air outlet;
a filter within the enclosure, the filter comprising a porous drum covered by a filter medium, the filter being positioned within the enclosure such that air flows from the air inlet, through the filter medium and the drum, and to the air outlet, such that the filter medium has a first side facing the air inlet;
one or more suction nozzles, each of the suction nozzles being positioned adjacent to the first side of the filter medium and adapted to draw off dust deposited on or in the filter medium; and
one or more complementary compressed air nozzles, each of the compressed air nozzles being positioned proximate to the first side of the filter medium and a corresponding one of the one or more suction nozzles and adapted to direct compressed air at the first side of the filter medium so as to drive dust toward the corresponding one of the one or more suction nozzles.

2. The filtration and cleaning apparatus of claim 1, further comprising a drive system coupled to the drum and adapted to drive the drum to rotate.

3. The filtration and cleaning apparatus of claim 2, wherein the one or more suction nozzles are fluidly connected by a suction pipe that extends a substantial length of the drum filter.

4. The filtration and cleaning apparatus of claim 3, wherein the one or more compressed air nozzles are fluidly connected by a compressed air pipe that extends a substantial length of the drum filter.

5. The filtration and cleaning apparatus of claim 4, wherein the suction pipe and the compressed air pipe extend parallel and in proximity to one another.

6. The filtration and cleaning apparatus of claim 5, wherein the one or more suction nozzles each have a generally triangular shape, with a body that tapers from an elongate inlet to a smaller outlet that connects to the suction pipe.

7. The filtration and cleaning apparatus of claim 5, wherein the one or more compressed air nozzles each have a conical nozzle shape with a wide inlet and a narrow outlet.

8. The filtration and cleaning apparatus of claim 2, wherein the one or more compressed air nozzles are arranged to form an acute angle relative to the filter medium.

9. The filtration and cleaning apparatus of claim 8, wherein the compressed air nozzles are arranged to provide air in a direction of rotation of the drum.

10. The filtration and cleaning apparatus of claim 2, further comprising:
a flow diversion mechanism; and
a first network of piping between the flow diversion mechanism and the one or more suction nozzles;
wherein the flow diversion mechanism and the first network of piping divide the one or more suction nozzles into zones.

11. The filtration and cleaning apparatus of claim 10, further comprising:
one or more solenoids coupled between the one or more compressed air nozzles and a compressed air source, the one or more solenoids being triggered to open by air flow in the first network of piping, such that compressed air and suction are provided in concert.

12. A method for cleaning a filter medium, comprising:
receiving air with entrained particulate matter at an enclosure having therein a porous drum covered by a filter medium, the drum filter being configured and adapted to rotate in a defined direction of rotation while operating;
drawing the received air through the filter medium and the drum such that the entrained particulate matter is at least substantially deposited on or in the filter medium;
supplying a vacuum at one or more suction nozzles positioned proximate to a first side of the filter medium and drawing at least some of the deposited particulate matter from the filter medium off via a first piping network; and
simultaneously supplying compressed air at one or more compressed air nozzles positioned proximate to the first side of the filter medium and the one or more suction nozzles such that the compressed air drives the deposited particulate matter from the filter medium and into the one or more suction nozzles.

13. The method of claim 12, further comprising:
measuring a pressure drop across the filter medium and triggering said supplying vacuum and said supplying compressed air when the pressure drop is greater than a threshold value.

14. The method of claim 12, further comprising:
dividing the one or more compressed air nozzles and the one or more suction nozzles into one or more groups or zones and selectively activating some of the one or more groups or zones to clean portions of the filter medium.

15. The method of claim 12, wherein the compressed air is supplied in the defined direction of rotation of the drum.

* * * * *